United States Patent
Becker et al.

(10) Patent No.: US 9,401,596 B2
(45) Date of Patent: Jul. 26, 2016

(54) DEVICE FOR ACTUATING ACTUATORS IN A MOTOR VEHICLE

(75) Inventors: Jörg Becker, Pfatter (DE); Stefan Koller, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 1090 days.

(21) Appl. No.: 12/965,350

(22) Filed: Dec. 10, 2010

(65) Prior Publication Data

US 2011/0140516 A1    Jun. 16, 2011

(30) Foreign Application Priority Data

Dec. 10, 2009  (DE) .......................... 10 2009 057 709

(51) Int. Cl.
*H02H 5/12* (2006.01)
*F02D 41/20* (2006.01)
*F02D 41/22* (2006.01)

(52) U.S. Cl.
CPC ............. *H02H 5/12* (2013.01); *F02D 41/2096* (2013.01); *F02D 41/22* (2013.01); *F02D 2041/2086* (2013.01)

(58) Field of Classification Search
None
See application file for complete search history.

(56) References Cited

U.S. PATENT DOCUMENTS

| | | | | |
|---|---|---|---|---|
| 5,712,550 | A * | 1/1998 | Boll et al. | 318/434 |
| 7,369,383 | B2 * | 5/2008 | Allmeier et al. | 361/91.1 |
| 2002/0057545 | A1 * | 5/2002 | Maehara et al. | 361/78 |
| 2009/0121672 | A1 * | 5/2009 | Endou | 320/104 |
| 2009/0294195 | A1 * | 12/2009 | Otsuka et al. | 180/65.275 |

FOREIGN PATENT DOCUMENTS

| | | |
|---|---|---|
| WO | 2008040054 A1 | 4/2008 |
| WO | WO 2008040054 A1 * | 4/2008 ............... H02H 3/14 |

* cited by examiner

*Primary Examiner* — Scott Bauer
(74) *Attorney, Agent, or Firm* — Laurence A. Greenberg; Werner H. Stemer; Ralph E. Locher

(57) ABSTRACT

The invention relates to a device for actuating actuators in a motor vehicle having an at least partially metallic housing (MG) in which an electric circuit is arranged, which has at least one high-voltage-generating circuit (HES) for generating an output voltage ($U_{HS}$) which is higher than a voltage which is considered safe for people, from the on-board motor vehicle power system voltage. The electric circuit has a monitoring circuit (UES) which has a first input (E1) which is connected to a reference voltage ($V_{ref}$), and has a second input (E2) which is connected to the at least partially metallic housing (MG), and the output (A) of which is operatively connected to the high-voltage-generating circuit (HSS) in such a way that in the case of a differential voltage at the two inputs (E1, E2) which is higher than a predefined value, the high-voltage-generating circuit (HSS) is deactivated or the output voltage ($U_{HS}$) thereof is limited to a value of at maximum the voltage which is considered safe for people.

2 Claims, 1 Drawing Sheet

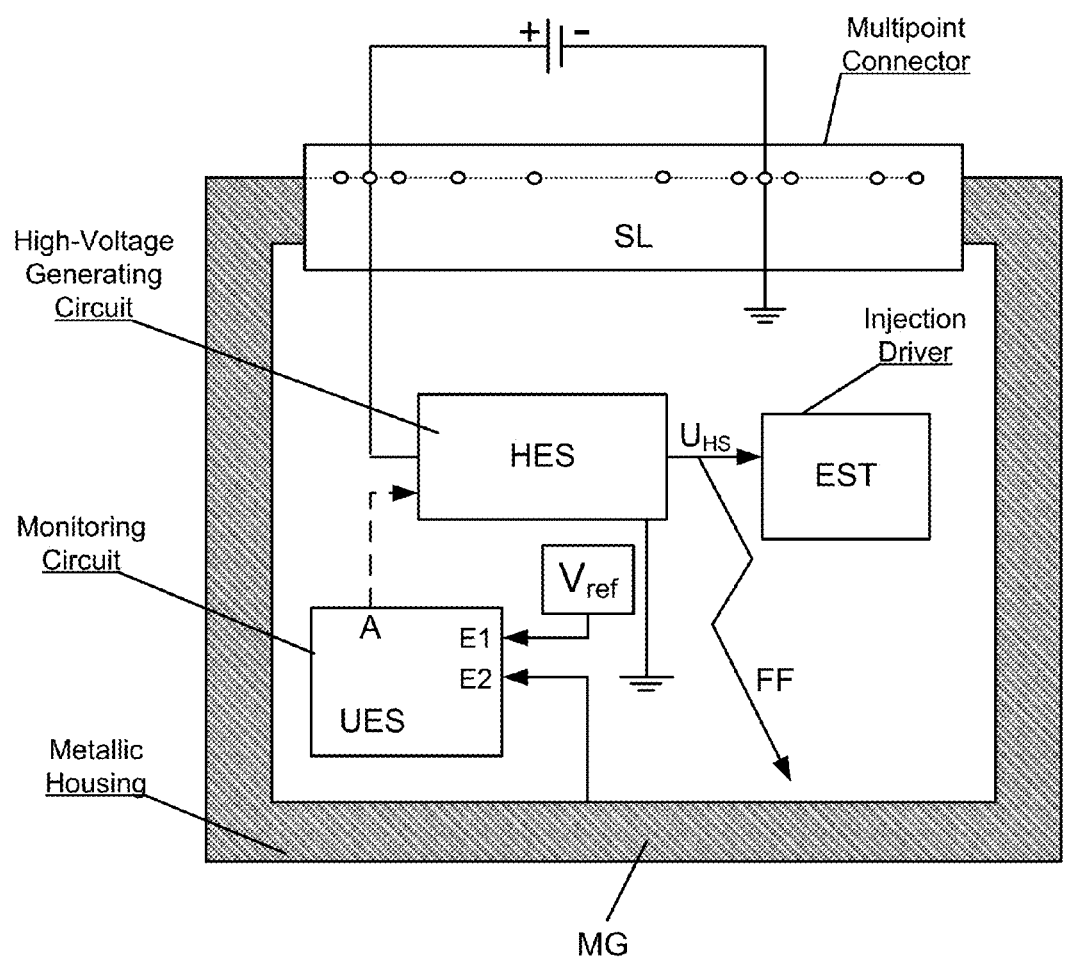

DEVICE FOR ACTUATING ACTUATORS IN A MOTOR VEHICLE

BACKGROUND OF THE INVENTION

Field of the Invention

The invention relates to a device for actuating actuators in a motor vehicle, having a metallic housing in which an electric circuit is arranged, which has at least one high-voltage-generating circuit for generating an output voltage which is higher than a voltage which is considered safe for people (for example a safety extra low voltage—SELV, dangerous contact voltages are >60 V DC or >25 VAC on the basis of currently valid standards), from the on-board power system voltage of the motor vehicle.

The engines in a number of contemporary motor vehicles have injection valves which are activated with piezo-actuators. These piezo-actuators require voltages of currently approximately 200 V to 400 V in order to be able to open and close the valves in the desired short time. Solenoid-operated injection valves also require voltages which can be above the safety extra low voltage in order to open and close quickly. Therefore, high-voltage-generating circuits for generating these voltages from the on-board power system of a motor vehicle with a voltage of currently 12 V or 24 V are provided in engine control units.

The engine control unit housings are usually fabricated entirely, or at least partially, from metal for strength reasons and other reasons such as, for example, the conduction away of heat, but also in order to ensure sufficient EMC protection. Often, these metallic housings are screwed directly to the bodywork of the vehicle which is also metallic, and they are therefore connected electrically to the vehicle ground. If the high output voltage of the high-voltage-generating circuits is applied to the metallic housing owing to a fault, fuses are provided which interrupt the supply of the control unit from the on-board power system of the motor vehicle as a result of this short circuit.

However, if the control unit is designed, internally and externally, in such a way that the metal housing is galvanically isolated from the ground of the on-board power system of the motor vehicle, this dangerous contact voltage cannot be dissipated. This means that this voltage would be applied to the metal housing during the operation of the vehicle and owing to discharge times of capacitors of up to 3 minutes after this.

BRIEF SUMMARY OF THE INVENTION

The object of the invention is to avoid this situation.

The object is achieved in that in a device for actuating actuators in a motor vehicle having an at least partially metallic housing in which an electric circuit is arranged, which has at least one high-voltage-generating circuit for generating an output voltage which is higher than a voltage which is considered safe for people, from the on-board motor vehicle power system voltage, the electric circuit has a monitoring circuit which has a first input which is connected to a reference voltage, and has a second input which is connected to the at least partially metallic housing, and the output of which is operatively connected to the high-voltage-generating circuit in such a way that in the case of a differential voltage at the two inputs which is higher than a predefined value, the high-voltage-generating circuit is deactivated or the output voltage thereof is limited to a value of at maximum the voltage which is considered safe for people.

The measure according to the invention consequently detects the level of voltages at the metal housing of the control unit and reduces them to a value which is below the extra low voltage range and therefore protects persons against electrical hazards in a motor vehicle.

BRIEF DESCRIPTION OF THE DRAWING

The invention will be explained in more detail below by means of an exemplary embodiment and with reference to a figure.

DESCRIPTION OF THE INVENTION

FIG. 1 shows a metallic housing MG of, for example, an engine control unit in a motor vehicle to which the battery voltage of the on-board power system of the motor vehicle, which is currently nominally 12 V or 24 V, is fed via a multipoint connector SL. The metallic housing MG is connected neither internally nor externally to the ground of the on-board power system here.

An electric circuit which comprises a high-voltage-generating circuit HES which is formed, for example, with a step-up chopper which generates, from the voltage of the on-board power system of the motor vehicle a desired high voltage $U_{HS}$ of, for example, 300 V with which an injection driver EST is actuated, is arranged in the housing.

If, in the event of a fault, this high voltage $U_{HS}$ is applied to the housing, which is indicated by the arrow FF, a voltage which is potentially fatal for human beings is applied to the housing.

In order to prevent this situation, the invention provides a monitoring circuit UES whose inputs E1, E2 are connected, on the one hand, to a reference voltage $V_{ref}$ and, on the other hand, to the housing MG, and which compares the differential voltage of these inputs E1, E2 with a predefined value, and if the differential voltage is higher than the predefined value it makes available a signal at its output A which either deactivates the high-voltage-generating circuit HES or limits its output voltage $U_{HS}$ to a non-hazardous value.

In contrast to circuit breakers which are customary in domestic power systems, in the device according to the invention the voltage which is applied to the housing is monitored directly, and it is not a possibly flowing current which is monitored.

Furthermore, the monitoring circuit is arranged directly in the housing and not in a fuse box.

The invention claimed is:

1. A device for actuating actuators in a motor vehicle having an on-board power system, comprising:
    an at least partly metallic housing;
    an electric circuit disposed in said housing;
    said electric circuit including:
        at least one high-voltage-generating circuit for generating an output voltage from an on-board motor vehicle power system voltage;
        a monitoring circuit having a first input connected to a reference voltage, a second input connected to said housing, and an output operatively connected to said high-voltage-generating circuit in such a way that, if a differential voltage at said first and second inputs is higher than a predefined value, said high-voltage-generating circuit is deactivated or the output voltage thereof is limited to a value of no more than 60 VDC.

2. The device according to claim 1, wherein the output voltage of said high-voltage-generating circuit is higher than 60 VDC when the output voltage of said high-voltage-generating circuit is not limited by said monitoring circuit.

* * * * *